UNITED STATES PATENT OFFICE.

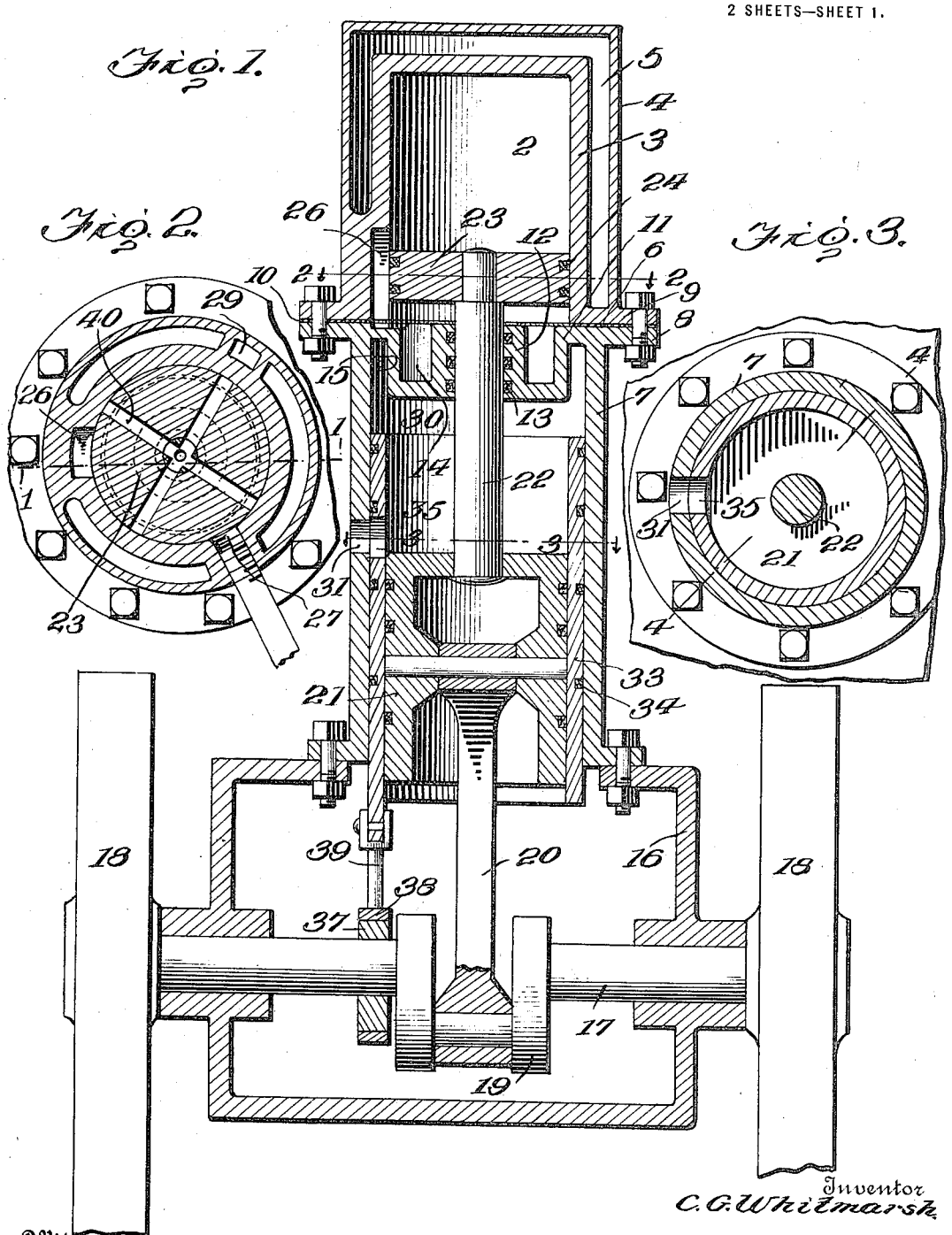

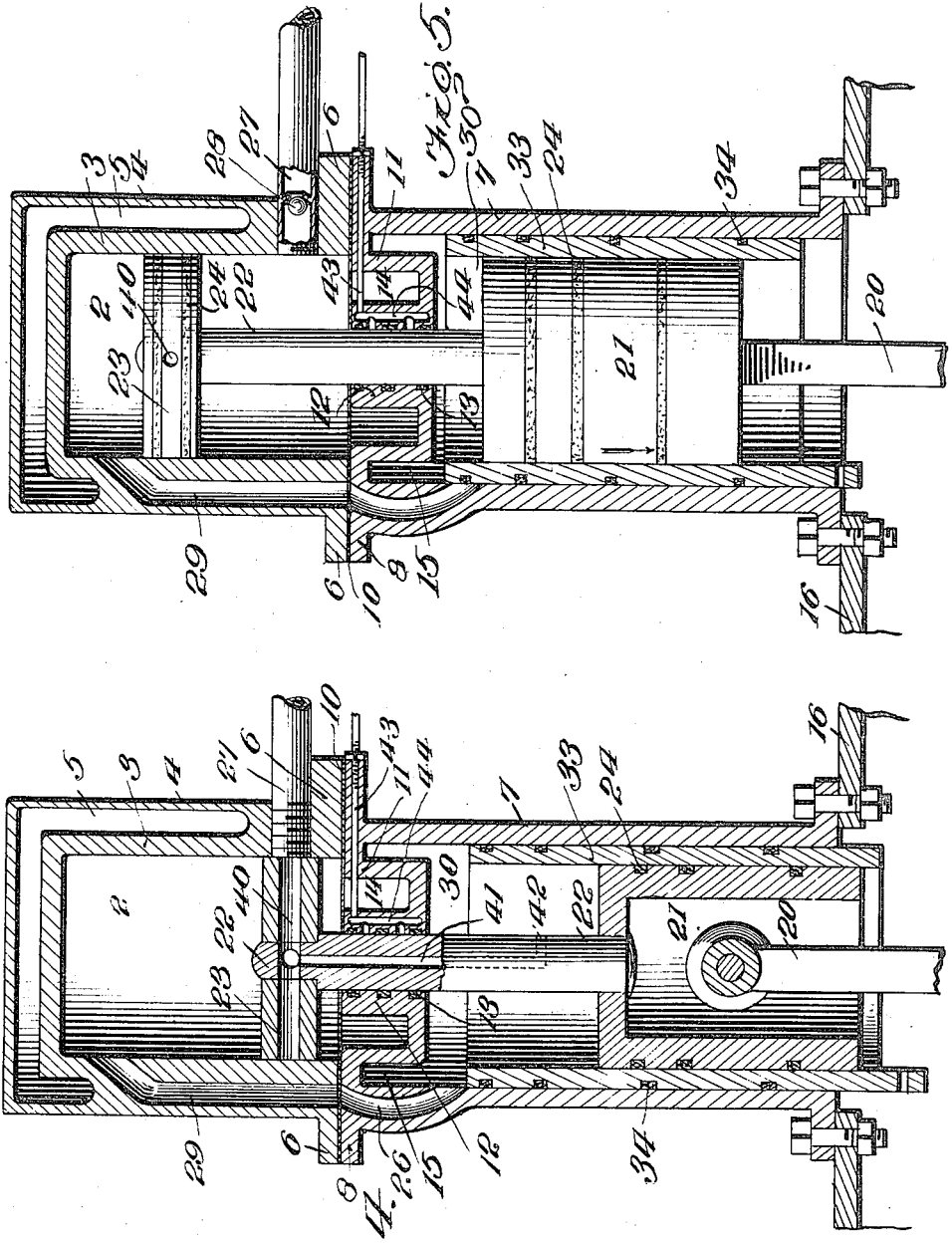

CHANCY GARFIELD WHITMARSH, OF HUMBOLDT, SASKATCHEWAN, CANADA.

COMPOUND SELF-IGNITING TWO-CYCLE ENGINE.

1,150,723.   Specification of Letters Patent.   Patented Aug. 17, 1915.

Application filed March 3, 1913. Serial No. 751,919.

*To all whom it may concern:*

Be it known that I, CHANCY G. WHITMARSH, subject of the King of Great Britain, residing at Humboldt, Province of Saskatchewan, Dominion of Canada, have invented certain new and useful Improvements in Compound Self-Igniting Two-Cycle Engines, of which the following is a specification.

My invention relates to internal combustion engines, and particularly to internal combustion engines of the two-cycle type.

The primary object of my invention is the provision of an internal combustion engine of the two-cycle type so constructed that the charge shall be fired, not by spark plugs or like ignition systems, but by the entrance of very highly compressed gases into the combustion chamber at the moment that the charge in said chamber is under proper compression therein.

A further object is to provide an internal combustion engine having the usual combustion chamber and in addition an expansion chamber into which the exploded gases may expand.

A further object is to so construct a two-cycle engine as to provide means whereby each fresh charge entering the combustion chamber may be caused to positively force out the burnt charge and scavenge the cylinder without mixing with it or becoming contaminated by the exploded gases.

A further object is to provide a two-cycle engine having a combustion chamber, a primary charge compression chamber, and a high compression and expansion chamber, that is, several chambers coacting with a double piston in such manner that the high compression and expansion chamber will alternately act to cause a high compression of the gases whereby the charge in a combustion chamber is ignited and act as an expansion chamber into which the gases caused by the explosion in the combustion chamber will pass and expand previous to being exhausted.

A still further object is to so construct an engine of the type referred to that only one valve shall be used for controlling the exhaust and the passage of the compressed igniting gases into the combustion chamber, and wherein all parts shall be of such a simple character that they will not readily get out of order or require repair.

Other objects will appear in the course of the following description.

My invention is illustrated in the accompanying drawings, wherein:

Figure 1 is a longitudinal section of an internal combustion engine constructed in accordance with my invention, the section being taken on the line 1—1 of Fig. 2; Fig. 2 is a section on the line 2—2 of Fig. 1; Fig. 3 is a section on the line 3—3 of Fig. 1; Figs. 4 and 5 are vertical sections on the lines 4—4 of Fig. 3, but showing different positions of the pistons and valve.

Referring to these figures, 2 designates a combustion cylinder of a two-cycle engine. This cylinder is formed of an outer and inner shell, designated 3 and 4, respectively, the outer and inner shells inclosing between them a water space 5 for the purpose of cooling the cylinder. The lower end of the shell 4 is formed with an outwardly extending annular flange 6. Disposed below the upper cylinder is a cylinder 7, the upper end of which is provided with an outwardly extending annular flange 8 abutting against the flange 6 and held thereto by bolts 9 or in any other suitable manner. A copper gasket 10 or like packing is disposed between the two flanges 8 and 6.

Formed integral with the upper portion of the cylinder 7 is a diaphragm 11. This diaphragm is formed with a central hub or bearing 12 provided with internal packing rings 13 for contact with the piston rod, and exteriorly of the central hub and the margin of the diaphragm the diaphragm is so formed as to provide an annular chamber 14 concentric with the head and with the margin of the diaphragm, this chamber being slightly smaller in diameter than the combustion chamber 2. The outer wall of this chamber 14 is spaced from the outer wall or shell of the cylinder 7 so as to leave an annular space 15 accommodating the upward movement of a sleeve valve as will be later described.

The lower end of the cylinder 7 is flanged and connected in any suitable manner to a crank case 16 through which passes the shaft 17 carrying one or more fly-wheels 18. The crank shaft is provided with the crank 19 as usual, and mounted on this crank is a connecting rod 20 connected to a piston 21 operating within the cylinder 7. This piston 21 is connected by means of a rod 22 to a piston 23 operating within the combustion chamber 2. Both the piston 21 and the piston 23 are provided with piston rings 24 of any usual or suitable construction. It is understood that the piston 23 moves coincidently with the piston 21 and that both of these pistons 23 and 21 move the crank shaft 17. The rod 22 passes through the hub 12 and this rod is packed by the rings 13.

The annular space 14 and the space immediately above the diaphragm 11 forms a pre-compression space or chamber, and this space is connected to the combustion chamber 2 by means of a port or passage 26 formed in the wall of the combustion chamber at the lower end thereof. It will be noted from Fig. 1 that the piston 23 is less in thickness than the length of the port 26, so that when the piston 23 is disposed between the upper and lower end of the port communication will be established between the pre-compression space or chamber 14 and the combustion chamber, so that the charge previously compressed within the chamber 14 will pass by means of the port 26 into the combustion chamber.

An inlet port 27 enters the wall of the combustion chamber at its lower end immediately above the diaphragm 11, and this port 27 is provided with a check valve 28 and is connected by any suitable duct with a carbureter, not shown, or other source of fuel. It will be obvious that as the piston 23 moves upward, the port 27 will be uncovered and communication will be established from the carbureter into the pre-compression space or chamber, and that as the piston moves downward the check valve will prevent the return of the charge, and the charge contained within the space between the under side of the piston and the diaphragm will be compressed in the pre-compression space, and that this compression will continue until the piston 23 has moved to a position below the upper end of the port 26 whereupon the compressed charge in the space beneath the piston will be forced into the combustion chamber.

Leading from the upper end of the combustion chamber 2, and preferably formed between the outer and inner shells of the combustion chamber, is a port or passage 29 which leads downward and opens into the interior of the cylinder 7 at a point coincident with or slightly below the lower face of the diaphragm 11. The space inclosed by the cylinder 7 and between the lower face of the diaphragm 11 and the upper face of the piston 21 forms a high compression and expansion chamber and is designated 30. The wall of the chamber 7 is provided at one point with an exhaust opening or port 31. Disposed within the cylinder 7 and longitudinally shiftable therealong is a sleeve valve 33, the outer face of which is provided with packing rings 34. This sleeve valve is formed with one port 35 adapted to register coincidently with the port 31. The sleeve valve is movable into the space 15 between the central portion of the diaphragm and the wall of the cylinder 7. The sleeve valve is shown as reciprocated by means of an eccentric 37 mounted upon the shaft 17 and provided with the eccentric ring 38 connected by means of the eccentric rod 39 to a prolongation of the sleeve valve. This eccentric is set approximately 90° ahead of the crank 19. Thus when the pistons 21 and 23 move upward, the valve will move upward but slightly in advance of the movement of the pistons.

For the purpose of supplying lubricant to the interior of the cylinder, I provide the piston 23 with a plurality of radial passages 40 communicating with radial passages formed in the upper end of the rod 22, these radial passages in the rod 22 communicating with a longitudinal passage 41 which extends down through the rod and is then angularly extended as at 42 and opens upon the face of the rod. Extending in through the wall of the cylinder 7 and preferably disposed at the upper end of the wall is a pipe or duct 43, preferably of copper, which extends across the annular chamber 14 and enters the hub 12. This hub 12 is formed with a vertical passage 44 having a plurality of branch passages opening upon the inner face of the hub. The passage 42 in the rod 22 is adapted to successively register with these branch passages leading from the passage 44 as the piston moves up or down. The outer end of the pipe 43 passes through a gland or other suitable device to prevent passage of mixture around the pipe. This pipe 43 is intended to be connected to any suitable source of lubricant and as the piston moves up and down and the opening 42 comes in register with the branches of the duct 44, oil will pass through said pipe 43 into the piston and the compression of air in the chamber 30 will cause the oil to be forced upward and outward through the radial passage 40 and so distributed over the inner face of the cylinder 2. At the same time the rings around the piston rod will be lubricated.

The operation of my invention is as follows: As illustrated in the drawings, the upper cylinder 2 and the lower cylinder 30 have different clearances, the lower cylinder having much less clearance than the upper cylinder. The pressure in the lower cylinder will therefore be greater than in the upper upon the upward movement of the pistons. Thus for instance if the clearance in cylinder 2 is $1\frac{1}{8}$ of an inch and the clearance in cylinder 30 is $\frac{1}{4}$ of an inch, then assuming that the cylinders are 2 inches in diameter, and that the pistons have a 2 inch stroke, the pressure in cylinder 2 when the piston is moved upward to its full extent will be 60.30 lbs. and in the cylinder 30 the pressure will be 135 lbs. approximately. When the passage between the cylinders 2 and 30 is opened, therefore, with the gas compressed in cylinder 30 to 135 lbs., this compressed gas will flow into the cylinder 2 as in this cylinder there is fully 60 lbs. pressure. This will cause the pressure in cylinder 2 to rise, and if cylinder 2 is warm enough this increase of pressure and consequent rise in temperature will cause the mixture to be exploded and as the passage between the cylinders 2 and 30 remains open until the end of the power stroke, the burning mixture will expand against both pistons.

It is, of course, to be understood that the chamber 30 has a port 31 opening to the exhaust manifold or muffler. Now, assuming that a charge is in the cylinder 2, that the chamber 30 is filled with burnt gases from the previous charge, and that the piston is in the position shown in Fig. 4, then upon an upward or compression stroke of the piston 23, the burnt gases remaining in the chamber 30 will be compressed, the charge of gas in the cylinder 2 will be compressed, and a fresh charge will be sucked into the pre-compression space 14. As the pistons 21 and 23 move upward, the valve 33 will also move upward. The first movement of this valve 33 will act to close the port 29 and also the ports 31 (see Fig. 5). As before stated, when the pistons 21 and 23 reach their uppermost position, the charge will be compressed in the cylinder 2, burnt gases will be compressed in the cylinder 7, and fresh gas will be drawn into the pre-compression space. A continued movement causes a slight downward movement of the pistons, and as the valve 33 moves in advance of the pistons, it will open the port 29 whereupon the very highly compressed highly heated burnt gases in the upper portion of the cylinder 7 will rush out through the port 29 into the upper portion of the combustion chamber, and inasmuch as these gases are at a high temperature and as this high compression has still further heated the gases of the burnt charge, this will ignite the charge in the cylinder 2. The ignition of the charge in the cylinder 2 will now cause the pistons 21 and 23 to travel downward, the charge expanding in the cylinder 2 and also in the cylinder 30, and doing work against the piston 21 as well as against the piston 23. As soon as the piston 23 passes the upper end of the port 26, the compressed charge in the pre-compression space 14 will rush out through the port 26 into the lower end of the cylinder 2, and, at the same time, the valve 33 will move to uncover the exhaust port 31 and the incoming charge will sweep the burnt gases out through the port 29 and out through the port 31. This completes the engine cycle.

While I have only shown one cylinder of an internal combustion engine, it will be obvious that the same construction will be used for a plurality of cylinders with, of course, such variations as will be made necessary by having a plurality of cylinders instead of one. Where a single set of cylinders is used, there will be needed two fly-wheels, and these should be heavy, but where there are two or more of such cylinders, one fly-wheel will be sufficient. On account of the high compression, this motor will be difficult to crank if the cranking device is directly connected to the crank shaft as is now the case, but it will be obvious that the cranking device might be connected by gears to the crank shaft, and thus securing more leverage, so that small motors of this type can be easily started by hand. Motors having cylinders above three inches in diameter can be started by any of the mechanical means now in use.

While I have illustrated what I believe to be the best form of my invention, I do not wish to be limited thereto, as it is obvious that certain details of construction may be changed in many ways without departing from the spirit of my invention. It will be noted also that whereas in many of the motors using sleeve valves, the valve is subjected to the action of the exploded charge by being disposed within the explosion or combustion chamber, in my motor the sleeve valve is not subjected to this heating action, but is disposed in a separate casing, namely, the cylinder 7, and that though the hot gases pass from the combustion chamber through the cylinder 7, yet they are reduced in heat by the expansion to which they are subjected.

The sleeve valve 33 and the piston 21 are to be lubricated in any usual or well known manner as by a splash lubrication, for instance. The inlet valve may be of any desired type and be either automatic in its action or mechanically operated.

While I have shown no water jacket around the lower cylinder 7, in an engine of large size such a water jacket will be required on account of the greater heat developed by this type of engine. I have not illustrated the water jacket, however, as these jackets are in common use and their construction is obvious to those skilled in the art.

While I have illustrated only one port in the wall of the sleeve valve 33, it will be obvious that more ports may be disposed in this sleeve valve if desired.

While I have illustrated but one port in the walls of cylinder 30, it will be obvious that another port like 29 may be placed in the opposite side of the cylinder 30 and extend up the outside of cylinder 2, thus allowing the compressed mixture that exists in cylinder 2 to act on opposite sides of the sleeve valve 33, thereby balancing the valve.

Having thus described my invention, what I claim as new and desire to secure by Letters Patent is:

1. In an internal combustion engine, a working cylinder, and means for compressing the exploded exhaust gases from the working cylinder and forcing said exhaust gases under compression into the working cylinder at a time when the charge in the working cylinder is under compression and ready to be ignited whereby to ignite the charge.

2. In an internal combustion engine, a working cylinder, means for compressing exploded gases from the working cylinder coincidentally with a compression of the charge in the working cylinder, and forcing said compressed exhaust gases into the working cylinder at a time when the charge in the working cylinder is under compression and ready to be ignited.

3. In an internal combustion engine, a combustion chamber, a piston therein, means for admitting a charge of gas into the combustion chamber, a compression chamber, a compression piston therein, means for conducting the exploded gases from the combustion chamber into said compression chamber, and for compressing the exploded gases in the compression chamber to a higher degree than and coincidentally with the compression of the charge in the combustion chamber, said conducting means also admitting the compressed exploded gases in the compression chamber into the combustion chamber when the charge therein is under compression and ready to be ignited.

4. In an internal combustion engine, a combustion chamber, an alined compression chamber, pistons in the combustion and compression chambers moving coincidentally with each other and in the same direction, means for admitting a charge into the combustion chamber before said piston, means for admitting the passage of exhaust gases from the combustion chamber into the compression chamber at the end of the working stroke, and for establishing communication between the compression chamber and the combustion chamber at the moment when the charge in the combustion chamber is compressed and ready for ignition, whereby to ignite the charge, said means acting to establish communication between the compression chamber and the combustion chamber prior to the beginning of the working stroke.

5. In a two-cycle internal combustion engine, opposed cylinders separated by a partition and forming one a combustion chamber and the other a high compression chamber and provided with a duct connecting the inner end of the high compression chamber with the outer end of the combustion chamber, the inner end of the combustion chamber forming a pre-compression space and having a fuel inlet port, the high compression chamber being provided with an exhaust port, a piston in the combustion chamber, the combustion chamber being formed with a by-pass longer than the depth of the piston and adapted to connect the pre-compression space with the combustion chamber when the piston is at the inner end of the combustion chamber, a piston in the high compression chamber, a rod connecting the two pistons, a crank shaft operatively connected to said pistons, and a valve operatively connected to the crank shaft and shiftable to open the exhaust port of the high compression cylinder when the piston therein is in its outermost position, close said port and the duct when said piston moves inward, and open the duct and said port when fluid has been compressed in the inner end of the high compression cylinder.

6. In a two-cycle internal combustion engine, a combustion cylinder, a high compression cylinder in alinement therewith and separated by a partition, said partition being formed with an annular recess on its face toward the combustion cylinder, the inner end of the combustion cylinder in conjunction with the partition forming a pre-compression chamber, the wall of the cylinder being provided with a by-pass adapted to connect the pre-compression space with the combustion chamber, the wall of the combustion chamber and the high compression chamber being formed with a duct leading from the outer end of the former to the inner end of the latter, said high compression chamber being formed with an exhaust port, a piston in the combustion chamber, a piston in the high compression chamber, a rod connecting the pistons for coincident movement and passing through said partition, a crank shaft operatively connected to the piston in the high compression chamber, a sleeve valve disposed in said high compression chamber and having a port adapted to register with the port therein, said valve being adapted when in its innermost position to close the said duct, and means carried by the crank shaft for reciprocating said valve in advance of the piston.

7. In a two-cycle internal combustion engine, a crank case, a high compression cylinder mounted thereon and closed at its upper end by a diaphragm, said diaphragm being formed to provide a central hub, an annular space surrounding the central hub and facing away from the high compression cylinder, and an outer annular space between the diaphragm and the wall of the cylinder, the high compression cylinder being formed with an exhaust port, a combustion cylinder mounted upon and detachable from the high compression cylinder, the inner end of the cylinder being formed with a by-pass port extending to said diaphragm and with an inlet port, and with a duct leading from the outer end of the combustion cylinder to the inner end of the high compression cylinder, a check valve in the inlet port, a piston in the combustion cylinder, a piston in the high compression cylinder, a rod connecting said pistons and passing through the hub of the diphragm, an operative connection between the crank shaft and the piston of the high compression cylinder, an eccentric on the crank shaft, a sleeve valve surrounding the compression piston and slidable within the compression cylinder to control the port therein and the opening of said duct, said sleeve valve being operatively connected to the eccentric to cause the sleeve valve to move in advance of the movement of the compression piston.

8. In an internal combustion engine, a working cylinder, means for compressing exhaust gases from the working cylinder, and for forcing such compressed exhaust gases into the working cylinder at a proper time for ignition of a charge in such cylinder.

9. The method of securing ignition in internal combustion engines which consists in a portion of the combustion products of an explosion during the compression of the next charge and returning them to the cylinder to ignite said charge.

In testimony whereof I affix my signature in presence of two witnesses.

CHANCY GARFIELD WHITMARSH.

Witnesses:
H. H. MEYERS,
O. W. ANDREASEN.